United States Patent Office 2,789,995
Patented Apr. 23, 1957

2,789,995

ALKYLATION OF PHENOL WITH ACRYLONITRILE

Hugh W. Johnston, Montclair, N. J., assignor to Union Carbide and Carbon Corporation, a corporation of New York No Drawing. Application April 29, 1954, Serial No. 426,557

5 Claims. (Cl. 260—465)

This invention relates to ring alkylation of phenol with acrylonitrile. More particularly, it relates to the production of para-hydroxy phenyl propionitrile and orthohydroxy phenyl propionitrile and their derivatives.

It is known that when phenol is reacted with acrylonitrile in the presence of basic catalysts, phenoxy ethers are obtained rather than ring alkylated products.

While ring alkylation of phenol homologues such as meta-cresol and resorcinol with acrylonitrile in the presence of acid catalysts has been reported, it was acknowledged that this method was inapplicable to phenol.

It has now been found that ortho and para hydroxy phenyl propionitriles are readily prepared by reacting together in the liquid phase substantially equimolar proportions of phenol and acrylonitrile in the conjoint presence of anhydrous aluminum chloride and dry hydrogen chloride.

Aluminum chloride in the absence of hydrogen chloride is ineffective in that it reacts with the phenol to form resinous phenol-aluminum chloride complexes which are insoluble in the acrylonitrile and substantially non-reactive therewith. However, formation of these complexes can be avoided by passing a sufficient amount of dry hydrogen chloride through the reaction mixture. Moreover, in those instances where aluminum chloride has been added first to a phenol-acrylonitrile reaction mixture and thus formed an insoluble phenol-aluminum chloride complex, such complexes are effectively dispersed and rendered reactive to the acrylonitrile by treating the complex with dry hydrogen chloride.

The amount of aluminum chloride generally required for promoting ring alkylation in the presence of hydrogen chloride is from about 1/10 mol to 1 mol of aluminum chloride per mol of phenol and preferably about 0.5 per mol of phenol. The amount of hydrogen chloride generally required to disperse or prevent the formation of insoluble phenol-aluminum chloride complexes is preferably about an equivalent proportion with respect to the aluminum chloride in the reaction mixture.

Production of the ortho propionitrile isomer is favored by the use of low reaction temperatures and moderate concentrations of aluminum chloride catalyst. By low reaction temperatures are meant temperatures from about 10° C. to 50° C. and by moderate catalyst concentrations of aluminum chloride is meant an amount not appreciably exceeding a half mol per mol of phenol.

Reaction temperatures above 50° C. and up to the boiling point of the reaction mixture favor the production of para-hydroxy phenyl propionitrile.

If the para isomer is desired as the final product of a low temperature alkylation process which normally favors production of the ortho isomer, this can be readily accomplished by heating the reaction mixture after substantial alkylation has occurred to temperatures above 50° C. in the continued presence of the aluminum chloride catalyst.

Since the addition of aluminum chloride to phenol or a mixture of phenol and acrylonitrile usually initiates an exothermic reaction, it is desirable to dilute the phenol or phenol and acrylonitrile mixture with a volatile aliphatic hydrocarbon solvent that is substantially inert to the reactants or the catalysts. Suitable solvents, among others, are petroleum ethers, n-heptane and naphthas. The presence of solvent in the reaction mixture facilitates control of the exothermic reaction but is not essential. The reaction can, if desired, be conducted in the absence of such solvent.

The catalyzed reactions of phenol and acrylonitrile can be graphically illustrated as follows:

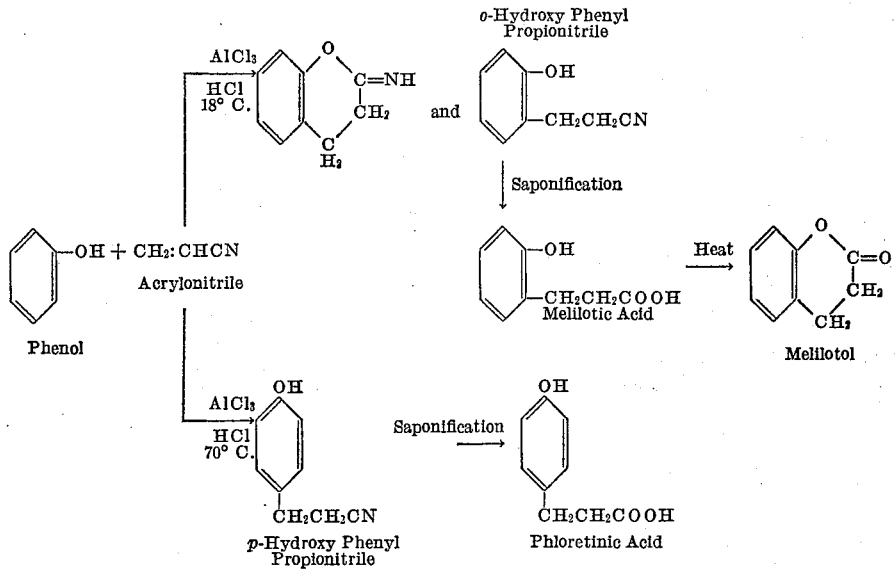

As indicated, the ortho alkylated compound tends to condense intra-molecularly as does its saponification product.

Both the ortho and the para hydroxy phenyl propionitriles are useful intermediates for the preparation of resins, plasticizers, etc. Either of the isomers can be condensed with aldehydes such as formaldehyde. The isomers can be hydrolyzed to the corresponding esters or acids. The corresponding acids can be condensed with epoxy compounds such as phenyl glycidyl ether to give compounds useful as plasticizers in vinyl resins.

EXAMPLE 1

*Preparation of ortho hydroxy phenyl propionitrile*

In a one liter, three-necked flask equipped with an all glass stirrer, gas inlet tube, reflux condenser and a capped tube for solids addition were placed:

53 grams (1 mol) acrylonitrile
94 grams (1 mol) phenol

The rapidly stirred reaction mixture was cooled to 18° C. by means of the external water bath and 66.7 grams (0.5 mol) of anhydrous aluminum chloride were added in small portions over a period of ten minutes. A yellow slurry was formed and the reaction temperature rose to 27° C. The slurry was resinous. Two hundred milliliters of low boiling petroleum ether were added and a stream of dry hydrogen chloride was bubbled through the reaction mixture over a period of one hour (20 cc. of HCl per minute) whereupon the resinous slurry changed to a mobile liquid. A three layer mixture was noted after the flask had been allowed to stand overnight. Two hundred milliliters of cold water were added to decompose the salts and the product as taken up in an equal volume of toluene, washed several times and separated. The solvents were removed under vacuum distillation and the residue was fractionated in a six inch helix-packed column. The fraction boiling at 136° C.–155° C. at 1 mm. was recovered and still contained some phenol. Redistillation gave 18 grams of product (12% theory based on phenol) of B. P. 153° C.–155° C. at 1 mm.

*Anal.*—Calculated N for $C_9H_9ON = 9.5\%$. Found $N = 9.2\%$.

That the product was ortho-hydroxy phenyl propionitrile was evidenced by the fact that upon hydrolysis an acid was obtained having a melting point of 81° C.–82° C. which is in agreement with the recorded melting point of ortho hydroxy phenyl propionic acid.

EXAMPLE 2

(a) *Preparation of para-hydroxy phenyl propionitrile*

In a two-liter, three-necked flask equipped with an all glass mechanical stirrer, gas inlet tube with fitted tip extending nearly to the bottom of the flask, a reflux condenser and a stoppered powder funnel for the addition of catalyst were added:

318 grams (6.0 mols) acrylonitrile (distilled).
564 grams (6.0 mols) phenol.
300 grams n-heptane.

While a constant stream (20 cc. per minute) of anhydrous hydrogen chloride was passed through the mixture, 453 grams (3.47 mols) of anhydrous aluminum chloride were added with vigorous stirring over a 2½ hour period; the reaction temperature varying between 15° C. and 27° C. during this time. The mixture was cooled in an ice-water bath. After standing overnight the mixture was refluxed for one hour at atmospheric pressure after which it was decomposed by pouring over 2 liters of cracked ice. The organic layer was separated and washed four times with 200 ml. portions of 10% aqueous potassium chloride, separated and the solvent removed in vacuo. The phenolic residue was fractionated in a 12 inch helix-packed column to give phenol (B. P. 62° C.–64° C. at 7.5 mm.); 32 grams of an intermediate of 103° C.–152° C. B. P. at 2 mm.; and 242 grams of a product having a B. P. 155° C.–166° C. at 2 mm. This product was redistilled at 162° C.–164° C. at 1–5 mm. and analyzed as follows:

*Anal.*—Calculated content of N for $C_9H_9ON = 9.5\%$. Found $N = 9.3\%$.

(b) *Preparation of p-hydroxy phenyl propionic acid*

In a 500 ml. round bottom flask equipped with a reflux condenser were placed:

91.5 grams (0.5 mol) of the product from (a)
84 grams (1.5 mols) potassium hydroxide
250 grams $H_2O$ The solution was refluxed for twenty hours, cooled and acidified with 6 N hydrochloric acid. White crystals were obtained which were crystallized three times from hot water to give 65 grams of platelets M. P. 125° C.–127° C. (131° C.–133° C. corrected); this in close agreement to the melting point given by Hanke, et al (J. Biol. Chem. 50, 245) for p-hydroxy phenyl propionic acid.

(c) The product obtained in (a) was further identified by reacting it with phloroglucinol. The resulting reaction product was a white powder M. P. 234° C.–236° C. uncorrected; corrected 237° C.–249° C., which identified it as phloretin formed according to the following reaction:

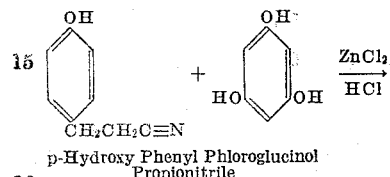

p-Hydroxy Phenyl Phloroglucinol
Propionitrile

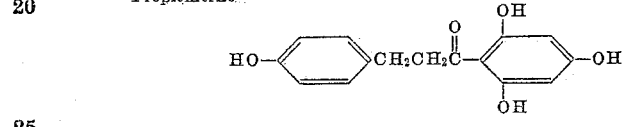

Phloretin (d) *Condensation of p-hydroxy phenyl propionic acid with phenyl glycidyl ether*

In a one liter flask connected to a reflux condenser were placed:

33.2 grams (0.2 mol) of the product from (b)
60.0 grams (0.4 mol) phenyl glycidyl ether
100 ml. xylene
50 ml. tert.-butanol
1 gram benzyl dimethyl amine The clear solution was held at reflux for eighteen hours. After cooling, 100 ml. xylene and 200 ml. ether were added, and the organic layer separated and washed three times with water, three times with ten percent potassium hydroxide and again five times with distilled water.

The solvent was distilled off to a residue temperature of 144° C. at 1 mm. pressure. The residue was a tacky amber oil. Yield 60 grams. The product was identified as the phenyl glycidyl ether of p-hydroxy phenyl propionic acid formed according to the equation:

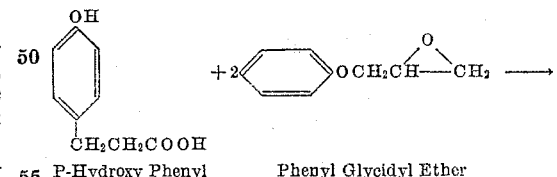

P-Hydroxy Phenyl        Phenyl Glycidyl Ether
Propionic acid

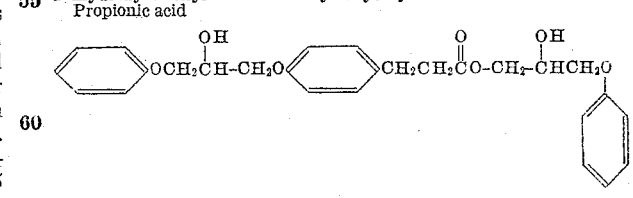

Phenyl Glycidyl Ether of p-Hydroxy Phenyl Propionic Acid

*Anal.*—Calculated for $C_{27}H_{30}O_7$ M. W. 466.5; theoretical ester No. 120; found ester No. 110; theoretical OH 7.36%; found OH, 7.42%.

(e) The reaction product from (d) was found to be compatible with a vinyl chloride (87%) vinyl acetate (13%) copolymer. One part of the reaction product with 9 parts of copolymer gave a clear flexible film.

What is claimed is:

1. Method for preparing ortho hydroxy phenyl propionitrile which comprises reacting together at a reaction temperature not in excess of about 50° C. substantially equimolar proportions of phenol and acrylonitrile in the presence of between 0.1 and one mol of anhydrous aluminum chloride per mol of phenol and sufficient anhydrous hydrogen chloride to prevent the formation of phenol-aluminum chloride complexes insoluble in acrylonitrile.

2. Method according to claim 1 for preparing ortho hydroxy phenyl propionitrile which comprises reacting together in the liquid phase phenol and acrylonitrile in the presence of anhydrous aluminum chloride and anhydrous hydrogen chloride and a hydrocarbon solvent.

3. Method for preparing ortho hydroxy phenyl propionitrile which comprises reacting together phenol and acrylonitrile at a reaction temperature not in excess of about 50° C. and in the presence of anhydrous aluminum chloride in an amount not exceeding about 0.5 mol per mol of phenol and of dry hydrogen chloride sufficient to prevent formation of phenol-aluminum chloride complexes insoluble in the acrylonitrile.

4. Method for preparing para-hydroxy phenol propionitrile which comprises reacting together at a reaction temperature not in excess of about 50° C. phenol and acrylonitrile in the liquid phase and in the presence of a catalytic amount of anhydrous aluminum chloride and sufficient anhydrous hydrogen chloride to prevent formation of phenol-aluminum chloride complexes insoluble in the acrylonitrile to form a reaction product containing ortho-hydroxyphenol propionitrile, and then heating the reaction product to a temperature above 50° C. in the presence of anhydrous aluminum chloride to isomerize the ortho-hydroxyphenol propionitrile to para-hydroxyphenol propionitrile.

5. Method for preparing ortho-hydroxyphenyl propionitrile which comprises reacting together at a reaction temperature not in excess of about 50° C. substantially equimolar portions of phenol and acrylonitrile in the presence of between 0.1 and 1 mole of anhydrous aluminum chloride and an equivalent portion with respect to the aluminum chloride of anhydrous hydrogen chloride.

References Cited in the file of this patent

FOREIGN PATENTS 870,273   Germany _____ Mar. 12, 1953